(12) United States Patent
Moore

(10) Patent No.: US 7,071,405 B2
(45) Date of Patent: Jul. 4, 2006

(54) INDEPENDENT POWER BANK SYSTEM

(76) Inventor: Leslie A. Moore, 3146 Fiesta Dr., Dunedin, FL (US) 34698

( * ) Notice: Subject to any disclaimer, the term of this patent is extended or adjusted under 35 U.S.C. 154(b) by 205 days.

(21) Appl. No.: 10/899,317

(22) Filed: Jul. 26, 2004

(65) Prior Publication Data
US 2006/0017390 A1    Jan. 26, 2006

(51) Int. Cl.
*H01L 25/00* (2006.01)
*G05F 1/10* (2006.01)

(52) U.S. Cl. ............. 136/247; 136/252; 136/254; 136/251; 323/221; 323/227

(58) Field of Classification Search ............ None
See application file for complete search history.

(56) References Cited

U.S. PATENT DOCUMENTS 5,289,998 A * 3/1994 Bingley et al. .......... 244/172.7
5,522,944 A * 6/1996 Elazari .................... 136/248

OTHER PUBLICATIONS

Richard Smith, Daily Mirror, Feb. 21, 2004; p. 27.

* cited by examiner

*Primary Examiner*—Tuyet Thi Vo
(74) *Attorney, Agent, or Firm*—Dennis G. LaPointe

(57) ABSTRACT

An independent power bank system and intended use therefor, comprising an electromagnetic field generator and a power bank comprising one or more light bulbs, the light bulbs being filled with a gas capable of being lighted when subjected to a generated electromagnetic field; a system for producing usable voltage by producing a photovoltaic effect, said system being in a juxtaposition relationship to the one or more light bulbs; and a secondary antenna connected at one end to each end of the one or more light bulbs and another end being located near an edge of the generated electromagnetic field. The invention typically may be adapted to have a plurality of power banks arranged in a desired configuration to suit the intended use.

12 Claims, 6 Drawing Sheets

INDEPENDENT POWER BANK SYSTEM

FIELD OF THE INVENTION

This invention relates to the use of an electromagnetic field to activate gaseous forms of light bulbs, which in turn, allows for the production of electricity using photovoltaic cells or solar panels, thereby combining different old and new technologies to achieve the goal of producing electricity without the use of any fuel.

BACKGROUND

By using a resonant coil transformer or high frequency transformer or similar device as it is sometimes called (also commonly referred to as a Tesla Coil), a high voltage field is produced in the coil's output antenna, a toroid or ball, which acts as a large capacitor. On a well tuned coil, sparks and bolts of artificial lightning will emit from the antenna. The length of these are dependent on the size of the coil and amount of power being used. In this form, they are often used for display and special effects in films.

The current sent to the coil is fed into large capacitors that store the energy to a much higher value, and release it to a primary coil, then induces a secondary coil to resonate and produce high frequency, high voltage at the secondary terminal antenna that is normally a ball or toroid. As mentioned above, the secondary terminal antenna also acts as a capacitor surrounded by an electromagnetic field (EMF) and will emit sparks and streaks of artificial lightning, the length of these being dependent on the size and construction of the coil.

If a larger antenna is used, the coil can be tuned to a frequency where no sparks or lightning emit, but still form a high voltage electromagnetic field (EMF) around the antenna. The depth and size of this field is also dependent on the size of the coil and power used.

The purpose for which Nikola Tesla invented this system was for wireless transmission of power over a large area.

This system is small enough that the EMF is insignificant, but can be adequately shielded within a Faraday cage or similar enclosure. This practice is well documented in many of Nikola Tesla patents, and these coils are readily available commercially. Tesla coils come in many configurations, and can be powered by AC or DC current.

The secondary winding of a Tesla coil is normally connected to ground, but by connecting another large antenna to the secondary coil as a ground plane it can also produce a high frequency magnetic field. The ground plane is larger than the top antenna but is shown in the drawings herein at a smaller scale to reflect a size similar to the top antenna, for ease of illustration only. The primary and secondary coils, as well as the antenna are sized to produce particular required frequencies and incorporate a safety circuit to conduct any excess current to ground.

A gas filled bulb, like an ordinary Fluorescent tube will light up if placed any where near a running coil, and will be brightest at the edge of the high voltage field. The other end of the tube can be to ground. The electrical current from the high voltage field passes through the tube to ground and causes the excitement of the gases which light the bulb. A small high voltage capacitor connected to the light bulb also enhances the light emitted from the bulb.

A standard fluorescent bulb has filaments at each end that burn out due to heat and fatigue. This does not occur with high frequency electricity as no filaments are needed, only a terminal in and out of the bulb; it does not generate heat and the bulb will last until it is broken or the gas escapes. A burnt out fluorescent bulb will work when subject to the field. Further, a much brighter light is possible by using special purpose made bulbs, by adjusting the composition of the gases and luminescent coating inside the bulb.

The area around the coil antenna limits the number of bulbs that can be illuminated, but high frequency high voltage power can be conducted along a very thin wire, with little or no power loss. By using very thin insulated wire as secondary antennae of various lengths, one end connected to each end of the fluorescent tube and the other ends suspended at the edge of the high frequency fields surrounding the coils antenna, the bulb will light up several feet away. This method allows many bulbs to be illuminated at once in the very small area taken by the ends of the secondary antennae. The number of bulbs that can be illuminated is only governed by how many secondary antennae that can be placed around the coil. For ease of illustration, the secondary antenna to the bulbs are shown in the drawings as separate wires, but can be incorporated into a circuit board (not shown) that plugs onto the bulb holder and terminates as a small pin with a very small footprint at the edge of the EMF.

The coil input and output remains constant and is not affected by the number of bulbs used. A good analogy of this effect is radio. A radio station's power covers an area governed by its output, and any number of radios switched on in that coverage area does not affect the station.

If several bulbs are placed together in line a small distance apart, a large area of light is created.

SUMMARY OF THE INVENTION

The present invention utilizes the above-described technology in combination with photovoltaic cells or solar panels. By placing photovoltaic cells or solar cell panels at both sides of the bulbs, the panels will create direct current (DC) electricity just like they do in sunlight, the amount of which is dependent on the brightness of the bulbs. Photovoltaic cells typically are made up of many light sensitive cells that produce electrical energy when subjected to light. Also known commonly as solar panels, they are widely used as an alternate power source and to supplement the use of utility supplied power. Solar technology today has progressed so panels can be configured to many sizes, shapes and voltages and to process artificial light more efficiently. The panels can be connected in series or parallel in each bank to provide more voltage or amperage as required, just the same method as in connecting batteries.

These panels can be very thin and by placing several rows of bulbs, with panels at either side of each row of bulbs, a small power bank or power pack measuring only a few feet in length can be formed. Further, several power banks can be placed around the coil. The power banks can be configured to be stacked and interconnected to form the desired configuration and obtain a desired power output.

The amount of power produced is relative to the brightness of the bulbs which are acting on the panels like a miniature sun and will produce power as long as the coil is running, that is, it is capable of a 24 hour, 7 days a week continuous operation.

If the Tesla coil is powered by a battery, either directly or through an inverter, enough of the electricity generated can be diverted to be used to recharge the battery. The other power banks can be used to supply power to other utilities.

For example, if one set of bulbs with a solar panel at each side connected in series produces 5 volts DC, a bank of 10 sets of bulbs will produce 50 volts DC, 2 banks 100 volts and so on.

Solar technology today has progressed so panels can be configured to many sizes, shapes and voltages and to process artificial light more efficiently, and with the technology available to produce brighter bulbs, the potential output of a power bank can be significantly increased. With a power control system the unit will run as a stand alone system and has many uses, some of which are, power for homes, automobiles and as generators for remote use by military or humanitarian organizations in remote areas.

This system has no moving mechanical parts and will only stop if there is an electrical component failure.

DETAILED DESCRIPTION OF THE INVENTION

Figure 1A:
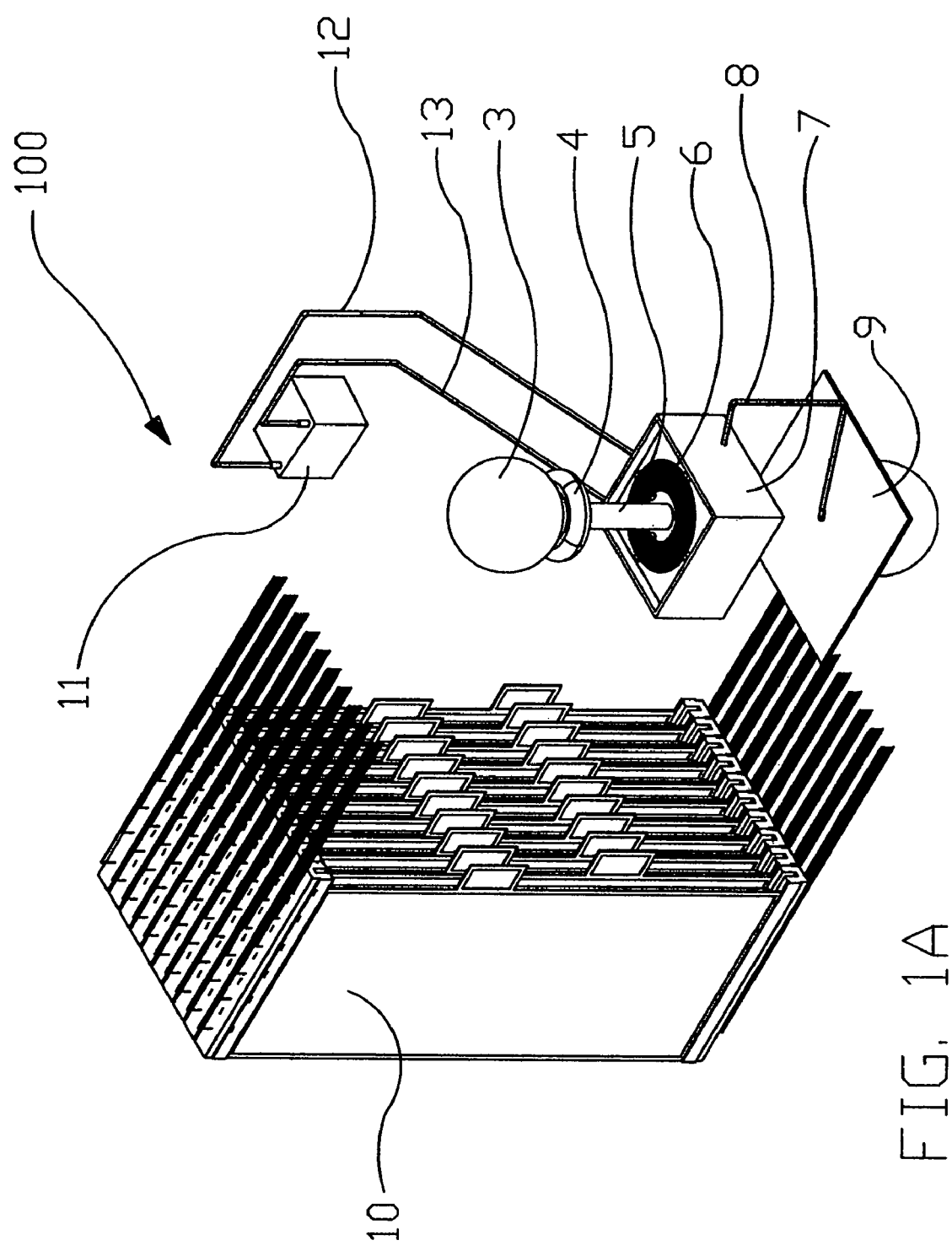
FIG. 1A is a conceptual depiction of one embodiment of the present invention.

Referring now to the drawings, FIGS. 1A,1B, 2A, 2B and 3 disclose conceptual embodiments of the present invention, which is an independent power bank system, depicted generally as 100.

The independent power bank system 100 includes means 102 for generating an electromagnetic field over a predetermined area and a power bank 10. The power bank 10 comprises one or more light bulbs 1, which are filled with a gas capable of being lighted when subjected to a generated electromagnetic field, such the gaseous contents of a fluorescent bulb. The power bank 10 also includes means 104 for producing a photovoltaic effect located in a juxtaposition relationship to the one or more light bulbs 1, wherein a usable voltage is created when the one or more bulbs 1 are lighted.

A secondary antenna 2 is connected at one end to each end of the one or more light bulbs and another or opposite end is located near an edge of the generated electromagnetic field.

The means 102 for generating the electromagnetic-field comprises a power source 11 such as a battery in electrical communication (see power cables 12 and 13) with a coil assembly 102A. Typically such a coil assembly 102A would have at least a primary coil 6 and a secondary coil 5 and would be grounded. Preferably the secondary coil 5 is grounded to a ground plane 9 with a secondary ground connector 8. Connector 8 can be a wire or other grounding connector known in the art.

An example of such means 102 for generating the electromagnetic-field is the use of one or more Tesla coil system 102A, which is typically, but not limited to, configured to include a primary coil 6, a secondary coil 5, preferably but not necessary a ground plane 9 and one of a main antenna 3, a toroidal coil 4 and a combination of a main antenna 3 and a toroidal coil 4. The coil system 102A is typically partially supported by an enclosure or Tesla body 7.

Figure 1B:
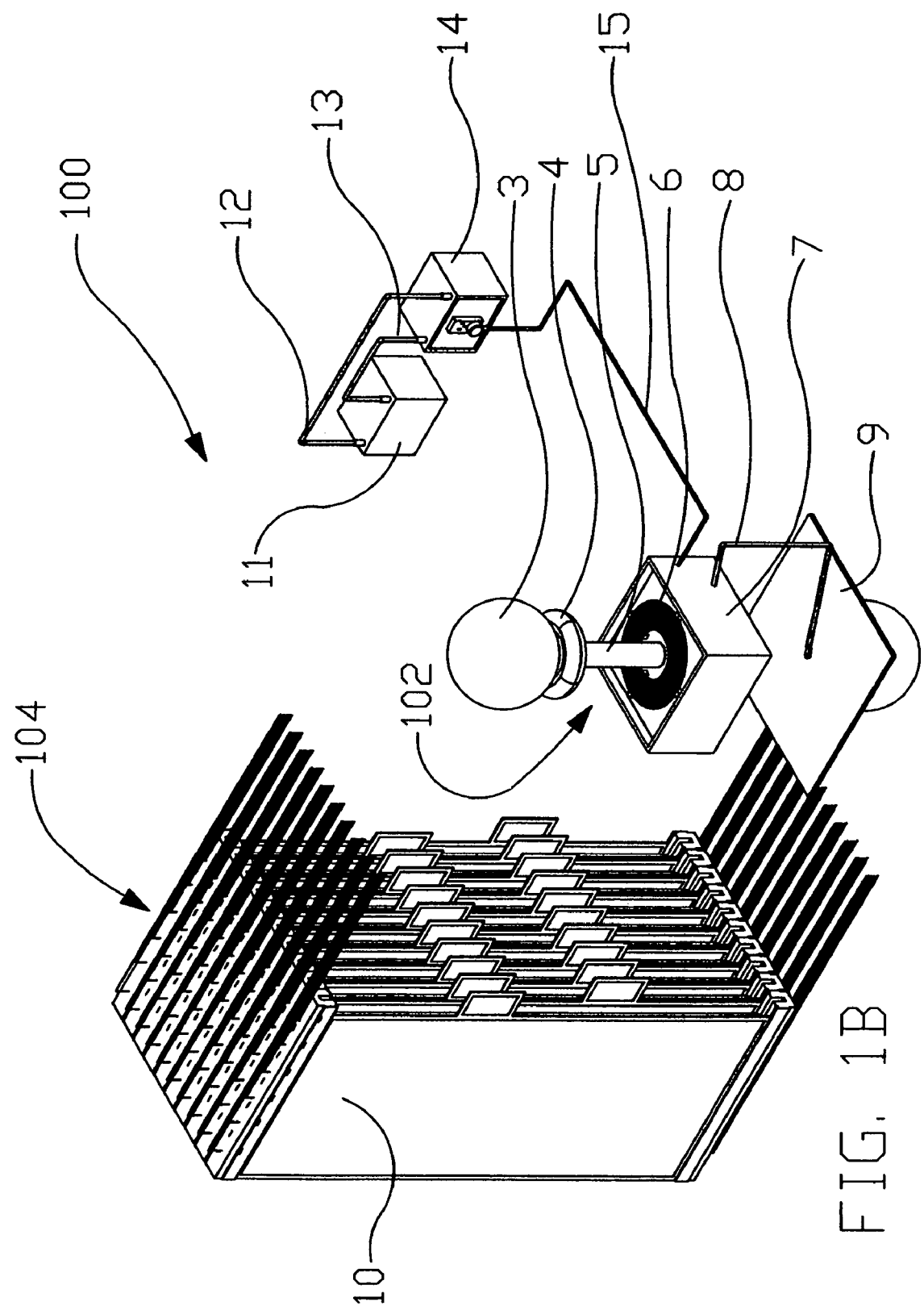
FIG. 1B is a conceptual depiction of the embodiment of the present invention depicted in FIG. 1a with the insertion in the circuitry of an inverter.
Figure 2A:
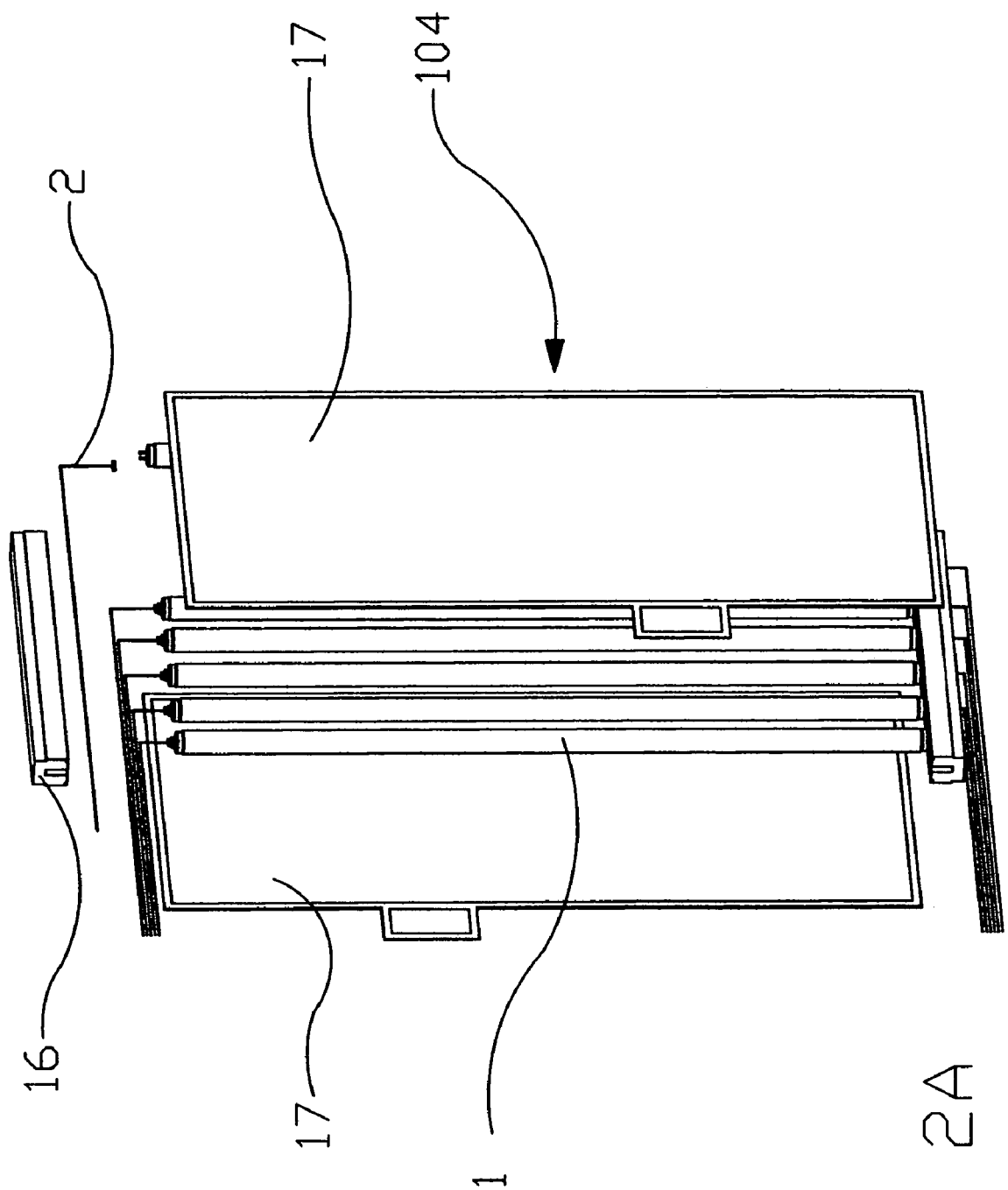
FIG. 2A is a conceptual exploded view of an example of a configuration of a combined solar panel, bulb and antennae assembly used in the present invention.
Figure 2B:
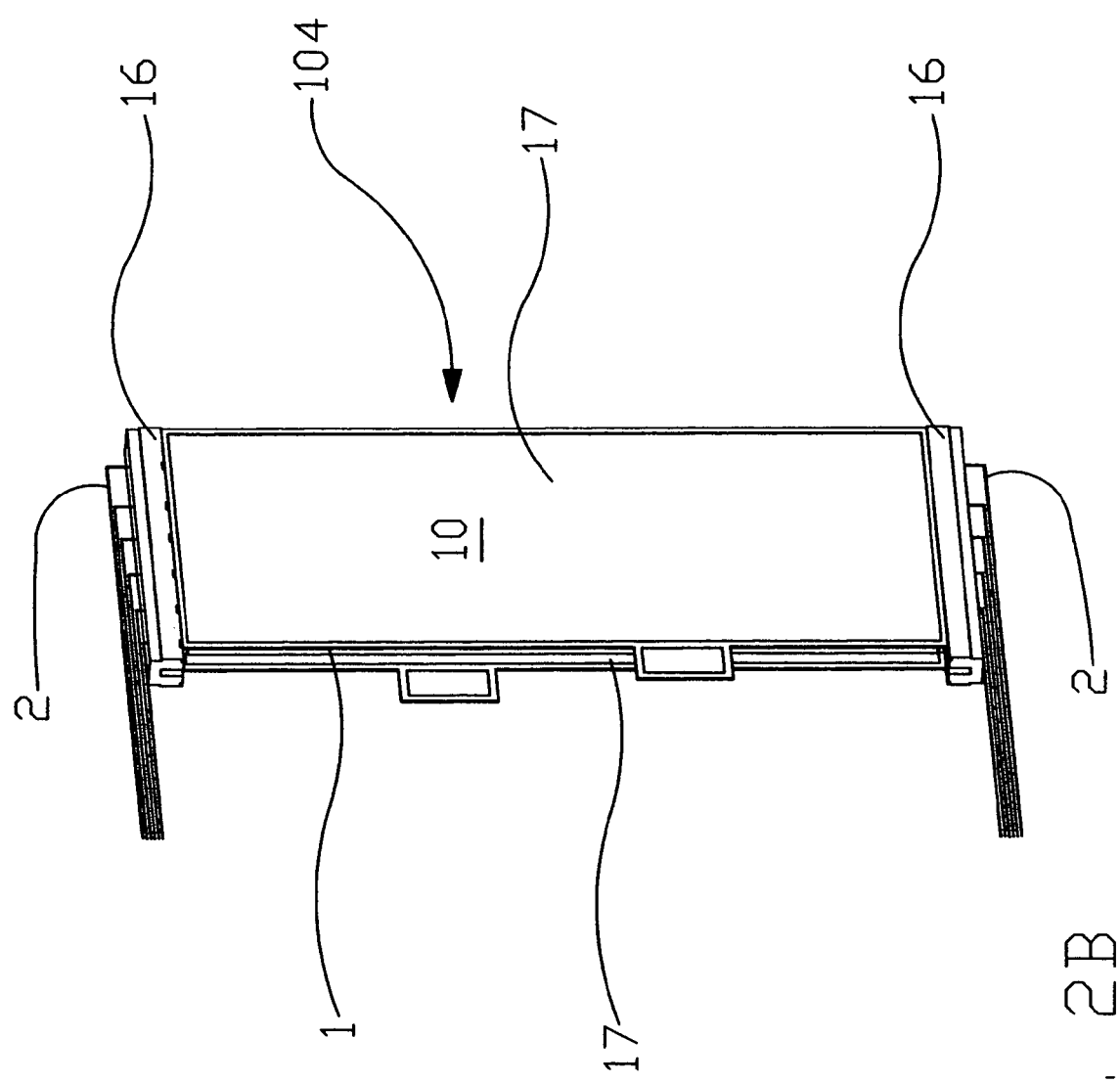
FIG. 2B is a conceptual view of the example configuration of the assembly of FIG. 2A as assembled.
Figure 3:
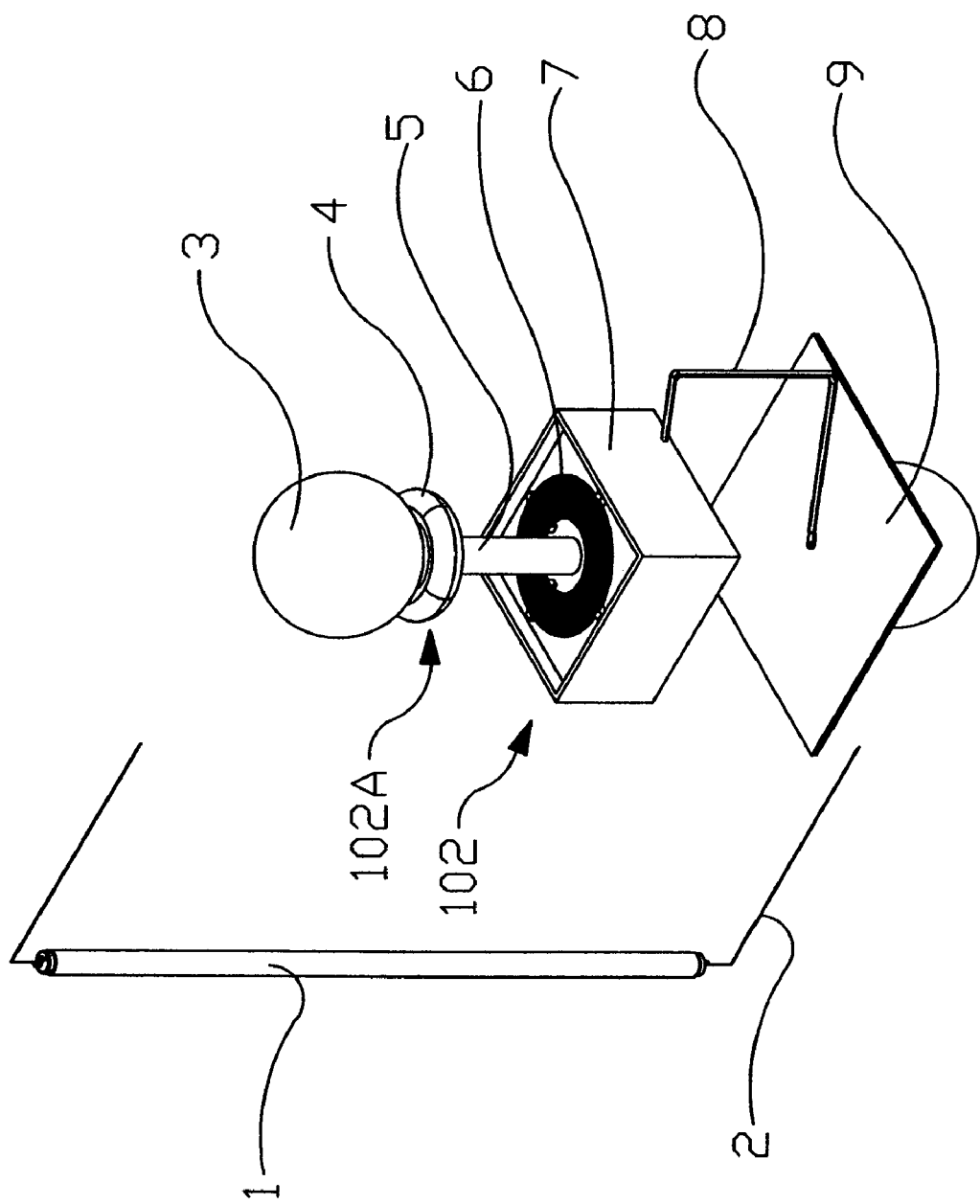
FIG. 3 is a schematic depiction of a Tesla coil assembly with a fluorescent bulb representationally located within the electromagnetic field of the coil.

The type of power needed to power the coil system 102A can be alternating current (AC) or direct current (DC) and an inverter 14 (for example, 12 VDV-120 VAC) can be utilized in the circuitry as shown in FIG. 1B, where power cable 15 is connected from the inverter 14 to the coil system 102A circuitry.

The means 104 for producing a photovoltaic effect comprises a panel 17, wherein the panel 17 can be made from an array of one or more photovoltaic cells, an array of one or more solar cells or a combination of the photovoltaic cells and solar cells.

A plurality of power banks 10 may be arranged in almost desired configuration to generate the desired power for operating the intended equipment such as a generator, vehicles, etc. In addition, in order to get the most effective arrangement of power banks 10 to suit where the invention is to be used, the power banks 10 may be stacked, arranged in series, in a parallel array, whatever array which will obtain maximum lighting efficiency from the generated EMF field, which in turn provides light for the cells 17. For example, in FIGS. 1A and 1B, the power bank system 10 is a set of several side by side power banks 10. The bulbs 1 are held together using an elongated bulb holder 16 (see FIGS. 2A and 2B).

Depending on the size and power generated, one skilled in the art will know the cabling size required between each component.

Figure 4:
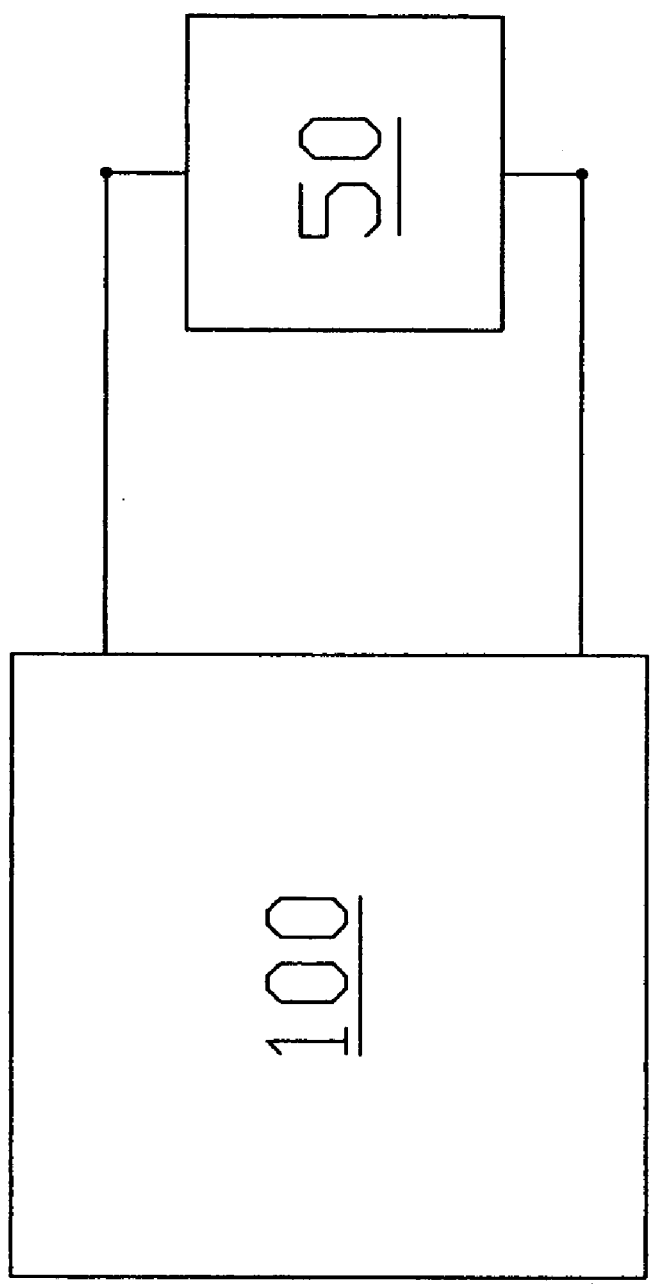
FIG. 4 is schematic representation depicting the present invention being used as a stand alone system placed in electrical communication with an intended system 50 to be independently operated/powered using the invention.

As mentioned above, the inventive power bank system 100 can be used for generating power as a stand alone system, when placed in electrical communication with an intended system 50 to be independently operated using the power bank system, as schematically represented in FIG. 4.

As noted above, for ease of illustration, the secondary antenna to the bulbs are shown in the drawings as separate wires 2, but can be incorporated into a circuit board (not shown) that plugs onto the bulb holder 16 and terminates as a small pin with a very small footprint at the edge of the EMF.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed is:

1. An independent power bank system comprising:
   means for generating an electromagnetic field over a predetermined area;
   a power bank comprising:
      one or more light bulbs, the light bulbs being filled with a gas capable of being lighted when subjected to a generated electromagnetic field;
      means for producing a photovoltaic effect, said means being in a juxtaposition relationship to the one or more light bulbs, wherein a usable voltage is created; and an antenna connected at one end to each end of the one or more light bulbs and another end being located near an edge of the generated electromagnetic field.

2. The system according to claim 1, wherein the means for generating the electromagnetic field includes at least one Tesla coil system comprising a primary coil, a secondary coil, a ground plane and one of a main antenna, a toroidal coil and a combination of a main antenna and a toroidal coil.

3. The system according to claim 1, wherein the means for producing a photovoltaic effect comprises a panel, said panel comprising one of:
   an array of one or more photovoltaic cells;
   an array of one or more solar cells; and
   a combination thereof.

4. The system according to claim 1, further comprising:
   a plurality of power banks arranged in a desired configuration.

5. The system according to claim 1, wherein the means for generating the electromagnetic-field comprises a power source in electrical communication with a coil assembly having at least a primary coil and a secondary coil, wherein the secondary coil is grounded to a ground plane.

6. The system according to claim 5, wherein the power source generates one of alternating current (AC) or direct current (DC).

7. A method of generating power as a stand alone system, the method comprising:
   providing a power bank system in electrical communication with an intended system to be independently operated using the power bank system, the power bank system comprising:
   means for generating an electromagnetic field over a predetermined area;
   a power bank comprising:
   one or more light bulbs, the light bulbs being filled with a gas capable of being lighted when subjected to a generated electromagnetic field;
   means for producing a photovoltaic effect, said means being in a juxtaposition relationship to the one or more light bulbs, wherein a usable voltage is created; and
   an secondary antenna connected at one end to each end of the one or more light bulbs and another end being located near an edge of the generated electromagnetic field.

8. The method according to claim 7, wherein the means for generating the electromagnetic-field includes at least one Tesla coil system comprising a primary coil, a secondary coil, a ground plane and one of a main antenna, a toroidal coil and a combination of a main antenna and a toroidal coil.

9. The method according to claim 7, wherein the means for producing a photovoltaic effect comprises a panel, said panel comprising one of:
   an array of one or more photovoltaic cells;
   an array of one or more solar cells; and
   a combination thereof.

10. The method according to claim 7, further comprising:
    a plurality of power banks arranged in a desired configuration.

11. The method according to claim 7, wherein the means for generating the electromagnetic-field comprises a power source in electrical communication with a coil assembly having at least a primary coil and a secondary coil, wherein the secondary coil is grounded to a ground plane.

12. The method according to claim 11, wherein the power source generates one of alternating current (AC) or direct current (DC).

* * * * *

UNITED STATES PATENT AND TRADEMARK OFFICE
CERTIFICATE OF CORRECTION

PATENT NO. : 7,071,405 B2  Page 1 of 1
APPLICATION NO. : 10/899317
DATED : July 4, 2006
INVENTOR(S) : Leslie A. Moore It is certified that error appears in the above-identified patent and that said Letters Patent is hereby corrected as shown below:

Col. 6, line 5
Replace "an secondary antenna"
with --an antenna--.

Signed and Sealed this

Twenty-ninth Day of August, 2006

JON W. DUDAS
*Director of the United States Patent and Trademark Office*